United States Patent
Miyazawa et al.

[11] Patent Number: 6,145,009
[45] Date of Patent: Nov. 7, 2000

[54] EVENT CONTROLLING SYSTEM FOR INTEGRATING DIFFERENT EVENT DRIVEN SYSTEMS

[75] Inventors: Takayuki Miyazawa; Hideaki Sato, both of Yokohama; Hiroshi Kaibe, Fuchu; Haruhiko Toyama, Kawasaki; Tetsuo Hasegawa, Tokyo; Takashi Moriyasu, Kawasaki; Toshibumi Seki, Odawara, all of Japan

[73] Assignee: Kabushiki Kaisha Toshiba, Kawasaki, Japan

[21] Appl. No.: 09/081,438

[22] Filed: May 19, 1998

[30] Foreign Application Priority Data

| May 20, 1997 | [JP] | Japan | 9-129869 |
| Jan. 9, 1998 | [JP] | Japan | 10-003141 |

[51] Int. Cl.[7] .................................................. G06F 13/00
[52] U.S. Cl. ............................................................ 709/236
[58] Field of Search .................................. 709/201, 202, 709/203, 206, 207, 208, 209, 217, 218, 219, 220, 236

[56] References Cited

U.S. PATENT DOCUMENTS

| 5,524,253 | 6/1996 | Pham et al. | 709/202 |
| 5,809,235 | 9/1998 | Sharma et al. | 709/230 |
| 5,838,913 | 11/1998 | Lysejko et al. | 709/208 |
| 6,012,095 | 1/2000 | Thompson et al. | 709/231 |
| 6,061,365 | 5/2000 | Yeung et al. | 370/470 |

OTHER PUBLICATIONS

Corba services: Event Serice Specification; Mar. 1995; Chapter 4, pp. 4–1 through 4–34.

*Primary Examiner*—Moustafa M. Meky
*Attorney, Agent, or Firm*—Finnegan, Henderson, Farabow, Garrett & Dunner, L.L.P.

[57] ABSTRACT

When inexecutable event occurs, an event format conversion rules table is referred to in order to convert the format of the event, then the communication message including the converted event is transmitted through a network. If the communication message is received through the network, the converted event is re-converted into an event that has an executable format by referring to the event format conversion rules table.

An event filter refers to an event filter table that has processing necessity information for each event and sends only an event that needs to be processed to an event processing portion. Even if the local system cannot execute an event, the event is transmitted to another system through a communicating portion.

20 Claims, 16 Drawing Sheets

FIG. 10

| IDENTIFIER | DATA WITH VARIABLE LENGTH (SOMETIMES, NONE) |
|---|---|
| A | DATA A |
| B | (NONE) |

FIG. 11

| IDENTIFIER OF PRE-CONVERTED EVENT | IDENTIFIER OF CONVERTED EVENT |
|---|---|
| a | A |
| b | B |

FIG. 12

| INPUT PORT NUMBER | IDENTIFIER OF CONVERTED EVENT |
|---|---|
| 100 | P |
| 101 | Q |

FIG. 13

| EVENT IDENTIFIER | NECESSITY OF PROCESSIVE |
|---|---|
| A | PROCESSING NECESSARY |
| B | PROCESSING NOT NECESSARY |
| C | PROCESSING NECESSARY |

FIG. 14

| EVENT IDENTIFIER | EVENT HANDLER |
|---|---|
| A | HANDLER A1, HANDLER A2, ··· |
| B | HANDLER B1 |

| EVENT IDENTIFIER | IDENTIFIER OF RESTORED EVENT |
|---|---|
| a | A |
| b | B |

EVENT CONTROLLING SYSTEM FOR INTEGRATING DIFFERENT EVENT DRIVEN SYSTEMS

BACKGROUND OF THE INVENTION

1. Field of the Invention

The present invention relates to an event controlling system for use with an event driven system such as a controlling system (including a controlling system composed of nodes connected to a controlling network) and a windows system, in particular, to an event controlling system for uniformly handling various events as well as transmitting and receiving events through a network.

2. Description of the Related Art

A conventional event driven system only processes events designated in one system. In other words, such a system receives events from a computer or a controlling unit so as to prosecute the inner process according to the received events.

In such a conventional system, a system in which a plurality of event driven systems uniformly deliver their events each other through a network is currently not available, so there is a problem that it is difficult to set up a new system by combining a plurality of event driven systems.

Moreover, even if events of various event driven systems are integrated and events delivering via network mechanism are constructed, events not in need of processing might be processed, which leads to another problem that the load of a unit that processes such events adversely increases.

SUMMARY OF THE INVENTION

The present invention is made from the above-described point of view.

A first object of the present invention is to provide an event controlling system that uniformly handles events of various event driven systems and seamlessly integrates various event driven systems.

A second object of the present invention is to provide an event controlling system that can structure an event delivering mechanism via a network.

A third object of the present invention is to provide an event controlling system that allows the load of an event processing unit to decrease.

A fourth object of the present invention is to provide an event controlling system that allows the loads of peripheral units (such as devices, a network, and a receiver side computer) of an event processing unit to decrease.

A fifth object of the present invention is to provide an event controlling system that adequately and smoothly controls an object such as a home appliance.

A sixth object of the present invention is to provide an event controlling system that can consistently operate in the case that a new apparatus to be controlled is added to the network in which another apparatus is in operation.

A first aspect of the present invention is an event controlling system, storing event format conversion rules, converting the format of an event into a particular format by referring to event format conversion rules when there occurs an event which cannot be processed, transmitting a communication message generated corresponding to the converted format by through a particular network, receiving the communication message through the network, restructuring an event that can be processed from the communication message received, and converting the restructured event to an event that has an executable format by referring to the event format conversion rules.

A second aspect of the present invention is an event controlling system, converting a first information that represents an event for controlling an object to a second information that has an executable format, selecting what needs to be processed out of the second information by referring to an event management area having processing necessity information for each event, and processing to drive an event corresponding to the selected second information.

A third aspect of the present invention is an event controlling system, selecting what needs to be processed out of first information that represents an event for controlling an object by referring to an event management area having processing necessity information for each event, converting the selected first information to a second information that has an executable format, and processing to drive an event corresponding to the second information.

A fourth aspect of the present invention is an event controlling system, receiving a first information that represents an event for controlling an object through a network, selecting what needs to be processed out of the received first information by referring to an event management area region having processing necessity information for each event, converting the selected first information to a second information that has an executable format, and processing to drive an event corresponding to the second information.

A fifth aspect of the present invention is an event controlling system, inputting a first information that represents an event for controlling an object, converting the first information to a second information that has an executable format, determining the way the second information is processed by referring to an area having information on how each event should be processed, selecting what needs to be processed out of the second information by referring to an event management area having processing necessity information for each event when the determined way of processing is to restore the event, and restoring the selected second information.

A sixth aspect of the present invention is an event controlling system, converting a first information that represents an event for controlling an object to a second information that has an executable format, determining the way the second information is processed by referring to an area having information on how each event should be processed, restoring the second information when the determined way of processing is to restore the event, and selecting what needs to be processed out of the restored second information by referring to an event management area having the processing necessity information for each event.

"Event" is an information for controlling an object. For example, "event" includes input/output data of controlling units of a computer or information that is input from a keyboard.

"Selecting means" is an event filter that receives events and discards events other than particular ones.

"Processing means" is an event processing unit that exchanges information that causes another unit to perform a process corresponding to a received event.

According to the present invention, events of different types handled by various event driven systems are uniformly handled so that different types of event driven systems can be seamlessly integrated, as well as event delivering systems via a network can be easily structured.

According to the present invention, since an event converting portion has an event filter that references a table that represents necessity/non-necessity of processing for each event and that is stored in a storing unit and sends only necessary events to an event processing portion, events can be adequately discarded and selected. Thus, the load of the event processing portion can be sufficiently decreased.

According to the present invention, an event converting portion has an event filter that references a table that represents necessity/non-necessity of processing for each event and that is stored in a storing unit and sends only necessary events to an event processing portion. In addition, even if a local controlling unit cannot execute an event, the controlling unit can cause another controlling unit to execute the event through a communicating means. Thus, the event converting portion can adequately discard and select events. Consequently, the load of the event processing portion can be sufficiently reduced.

According to the present invention, since an event restoring portion has an event filter that references a table that represents necessity/non-necessity of processing for each event and that is stored in a storing unit and sends only necessary events to an event processing portion, events can be adequately discarded and selected. Thus, the load of the event processing portion (mainly, devices) can be reduced.

According to the present invention, the event discard/selection criteria of the event filter can be dynamically changed, the efficiency of the overall system can be further improved.

Thus, according to the present invention, events can be adequately and smoothly controlled.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 10 shows an example of the structure of a converted event according to the second embodiment of the present invention;

FIG. 11 shows a first example of the structure of an event conversion table according to the second embodiment of the present invention;

FIG. 12 shows a second example of the structure of the event conversion table according to the second embodiment of the present invention;

FIG. 13 shows an example of the structure of an event filter table according to the second embodiment of the present invention;

FIG. 14 shows an example of the structure of an event handler table according to the second embodiment of the present invention;

DESCRIPTION OF PREFERRED EMBODIMENTS

Next, with reference to the accompanying drawings, an embodiment of the present invention will be described.

Figure 1:
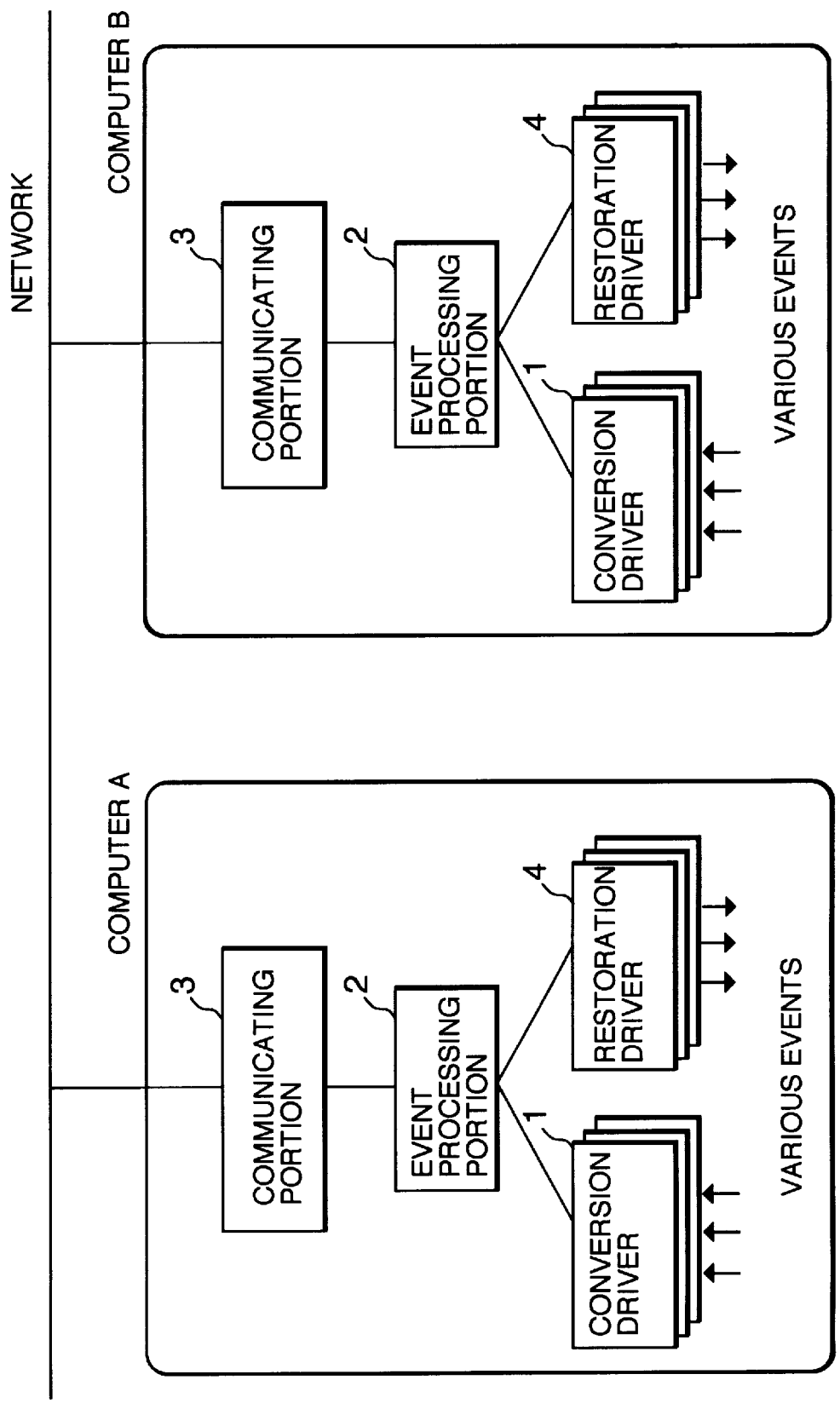
FIG. 1 is a schematic diagram showing an example of the overall structure of a distributed processing system to which an event controlling system according to a first embodiment of the present invention is applied.

FIG. 1 is a block diagram showing the structure of an event controlling system according to an embodiment of the present invention in the case that the event controlling system is disposed in a computer. In FIG. 1, with a plurality of computers (for example, two computers A and B) that are connected through a network and that communicate with each other, a so-called (intelligent) distributed processing system is structured. Each of the event controlling systems disposed in the computers A and B has a conversion driver 1, an event processing portion 2, a communicating portion 3, and a restoration driver 4.

The conversion driver 1 receives various events that take place in the local computer, references an event conversion table stored in a particular storing unit of the local computer, and converts the format of received events into a particular format (for example, a standardized format of the network) so that the event processing portion 2 can handle the received events. In this case, events comprise input/output data of controlling units of the computers A and B or key input data that is input from a keyboard.

When the event processing portion 2 has determined that an event received from the conversion driver 1 should be transmitted to the other computer, the event processing portion 2 adds for example event source address information and an event type information to the event and transmits the resultant event as a communication message to the communicating portion 3. In addition, the event processing portion 2 extracts an event from a communication message received from the communicating portion 3 and sends the extracted event to the restoration driver 4.

The communicating portion 3 transmits a communication message received from the event processing portion 2 to the other computer through the network. In addition, the communicating portion 3 sends a communication message (which includes an event) received through the network to the event processing portion 2. When the communicating portion 3 transmits a communication message including an event to a plurality of computers connected to the network, a particular protocol such as broadcast communication protocol or multi-cast communication protocol may be used.

The restoration driver 4 receives an event from the event processing portion 2, references the event convention table stored in the particular storing unit, and restores an original event (or converts the standardized format into the local format).

Communication messages that have been broadcast or multi-cast are temporarily received by the communicating portion 3. The communicating portion 3 selects only events that can be processed in its own computer and discards the other events. The selected events are sent to the event controlling system.

The event conversion table is used to convert an event format recognizable by a particular computer into an event format recognizable by another computer (for example, an application program) that processes the event or into a standardized format of the system in which an event is transmitted/received through a particular network. The event conversion table is stored beforehand in the event controlling system of each computer.

Figure 2:
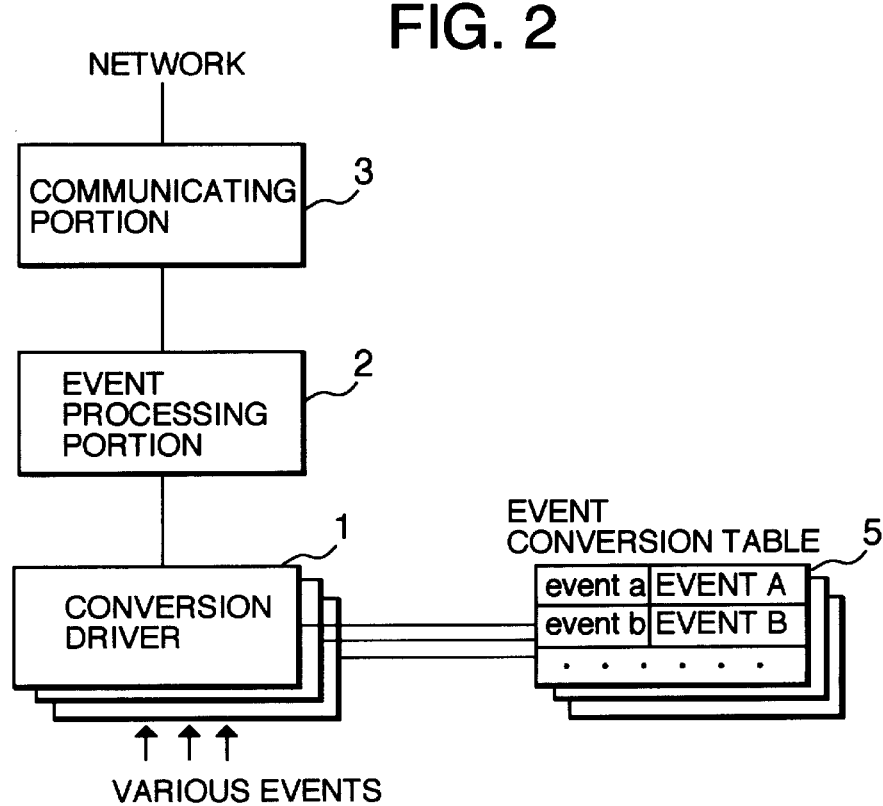
FIG. 2 is a schematic diagram showing an example of the structure of principal portions of the event controlling system according to the first embodiment of the present invention in the case that the event controlling system is disposed in a computer that sends an event.
Figure 3:
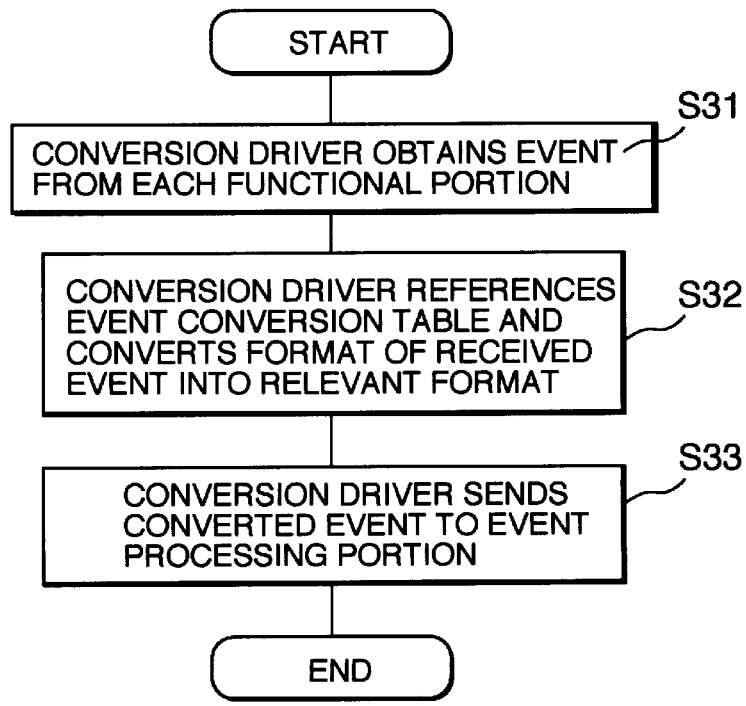
FIG. 3 is a flow chart for explaining the operation of the event controlling system according to the first embodiment of the present invention in the case that the event controlling system is disposed in a computer that sends an event.
Figure 4:
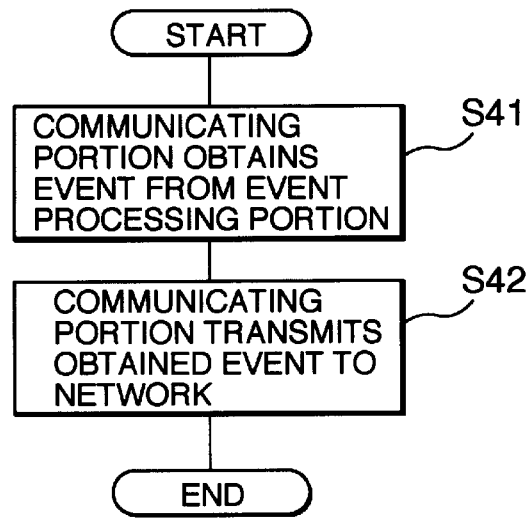
FIG. 4 is a flow chart for explaining the operation of the event controlling system according to the first embodiment of the present invention in the case that the event controlling system is disposed in a computer that sends an event.

Next, with reference to FIGS. 2, 3, and 4, a process performed in the case that an event takes places in each portion of a local computer and that the event is transmitted to another computer through the network will be described. FIG. 2 is a block diagram showing the structure of principal portions of the event controlling system disposed in a computer that transmits an event. FIGS. 3 and 4 are flow charts for explaining the operation of the event controlling system shown in FIG. 2.

Assuming that an "event a" takes place in a particular functional portion of the computer A shown in FIG. 1, the "event a" is received by the conversion driver 1 (at step S31 in FIG. 3). The conversion driver 1 references the event conversion table 5 stored in the particular storing unit and converts the "event a" into an "EVENT A" (at step S32). Thereafter, the conversion driver 1 sends the "EVENT A" to the event processing portion 2 (at step S33). When the event processing portion 2 has determined that the computer A can process the "EVENT A", the event processing portion 2 sends the "EVENT A" to a relevant functional portion (or through the restoration driver). The relevant functional portion processes the received event.

When the event processing portion 2 has determined that the computer A cannot process the "EVENT A" (for example, the event processing portion 2 has determined that the "EVENT A" should be transmitted to the other computer after referring to the registered events types processable at Computer A), the event processing portion 2 adds address information of the event source and so forth to the "EVENT A" and transmits the resultant data as a communication message to the relevant computer through the network via the communicating portion 3. In other words, the communicating portion 3 obtains a communication message including an event from the event processing portion 2 (at step S41 in FIG. 4) and transmits the event to the network (at step S42). When the communicating portion 3 transmits an event to a plurality of computers connected to the network, the communicating portion 3 may use a particular protocol such as broadcast communication protocol or multi-cast protocol.

Figure 5:
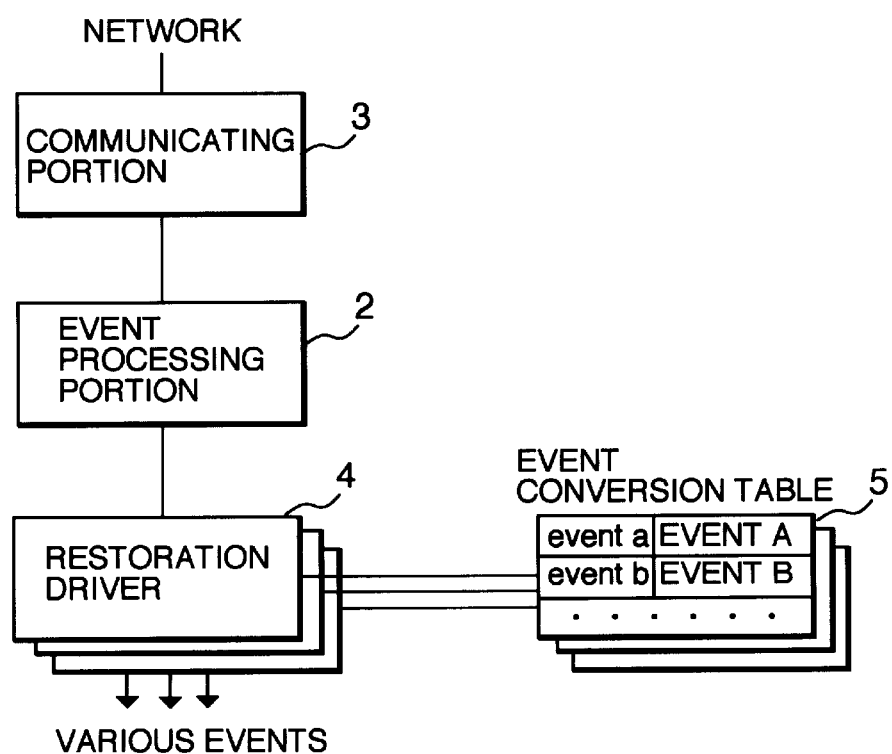
FIG. 5 is a schematic diagram showing an example of the structure of principal portions of the event controlling system according to the first embodiment of the present invention in the case that the event controlling system is disposed in a computer that receives an event.
Figure 6:
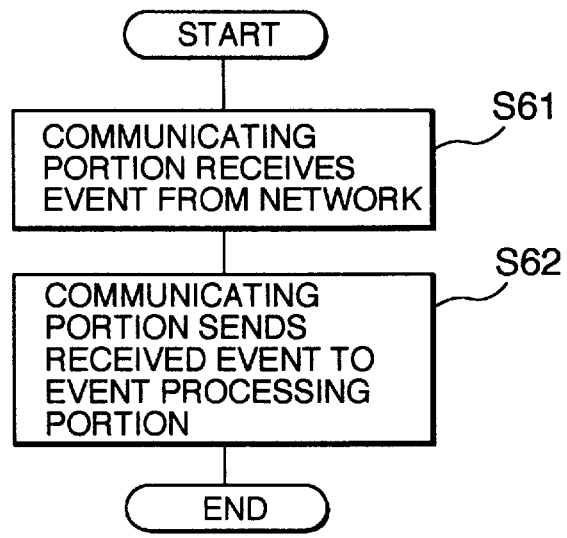
FIG. 6 is a flow chart for explaining the operation of the event controlling system according to the first embodiment of the present invention in the case that the event controlling system is disposed in a computer that receives an event.
Figure 7:
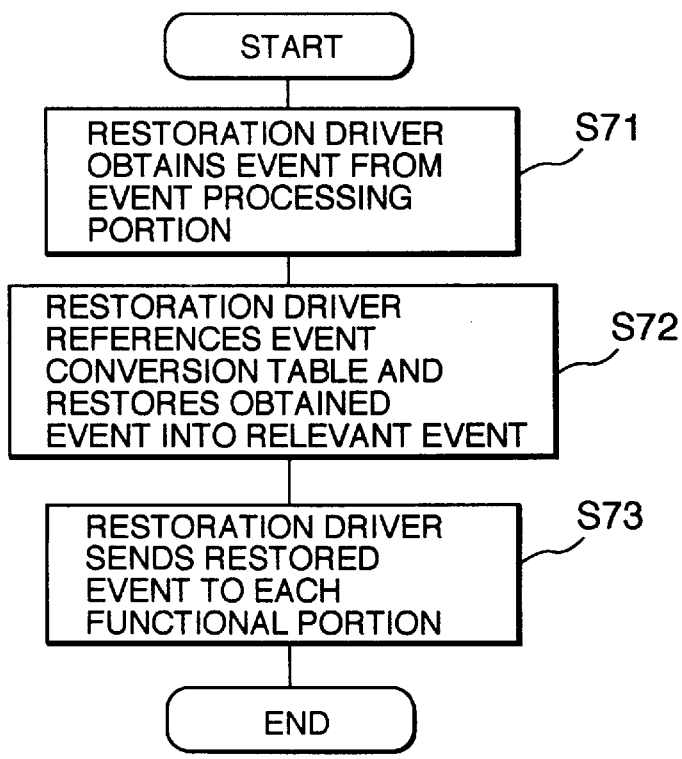
FIG. 7 is a flow chart for explaining the operation of the event controlling system according to the first embodiment of the present invention in the case that the event controlling system is disposed in a computer that receives an event.

Next, with reference to FIGS. 5, 6, and 7, a process performed in the case that a local computer receives an event from another computer through the network will be described. FIG. 5 is a block diagram showing an example of the structure of principal portions of the event controlling system disposed in a computer that receives an event. FIGS. 6 and 7 are flow charts for explaining the operation of the event controlling system shown in FIG. 5.

When the communicating portion 3 of the computer B receives a communication message including an "EVENT A" from the computer A through the network (namely, the communicating portion 3 receives the "EVENT A" that can be processed by the event processing portion 2 of the computer B) (at step S61), the communicating portions 3 sends the "EVENT A" to the event processing portion 2 (at step S62). When the obtained "EVENT A" should be sent to each functional portion of the computer B, the event processing portion 2 sends the "EVENT A" to the restoration driver 4. When the restoration driver 4 receives the "EVENT A" from the event processing portion 2 (at step S71 in FIG. 7), the restoration driver 4 references the event conversion table 5 stored in the particular storing unit and restores an "event a" corresponding to the obtained "EVENT A" (at step S72) and sends the "event a" to a relevant functional portion that processes the "event a" (at step S73).

With the above-described event controlling system, a distributed processing system can be structured as follows.

When an "event a" that takes place in the computer A is a command corresponding to an application program that runs on the computer B, the conversion driver 1 of the computer A converts the "event a" into a standardized format of the network or the format that can be recognized by the computer B. Thereafter, the event processing portion 2 generates a predetermined communication message including the event converted by the conversion driver 1 and sends the generated communication message to the communicating portion 3. The communicating portion 3 transmits the communication message to the network corresponding to broadcast communication protocol or multi-cast protocol. The computer B receives the communication message through the network. The restoration driver 4 of the computer B restores the event from the communication message (or converts the format of the communication message into a proper format of the computer B), starts up an application designated by the event, processes the received data as designated along with the event, and sends back the processed result to the computer A.

As described above, various events that take place in various event driven systems are uniformly processed through the network. Thus, a plurality of event driven systems can be seamlessly integrated through the network. In other words, with the conversion driver 1 that converts the format of various events that take place in applications and so forth of a computer into a format handled by the event processing portion 2 (in this case, a standardized format of the network) and the restoration driver 4 that converts the format of an event handled by the event processing portion 2 into a format handled by a relevant application program, a plurality of event driven systems can be uniformly handled. In addition, with the communicating portion 3 that transmits and receives events through the network, events that take place in a particular computer can be processed by other computers.

Next, with reference to the accompanying drawings, a second embodiment of the present invention will be described.

Figure 8:
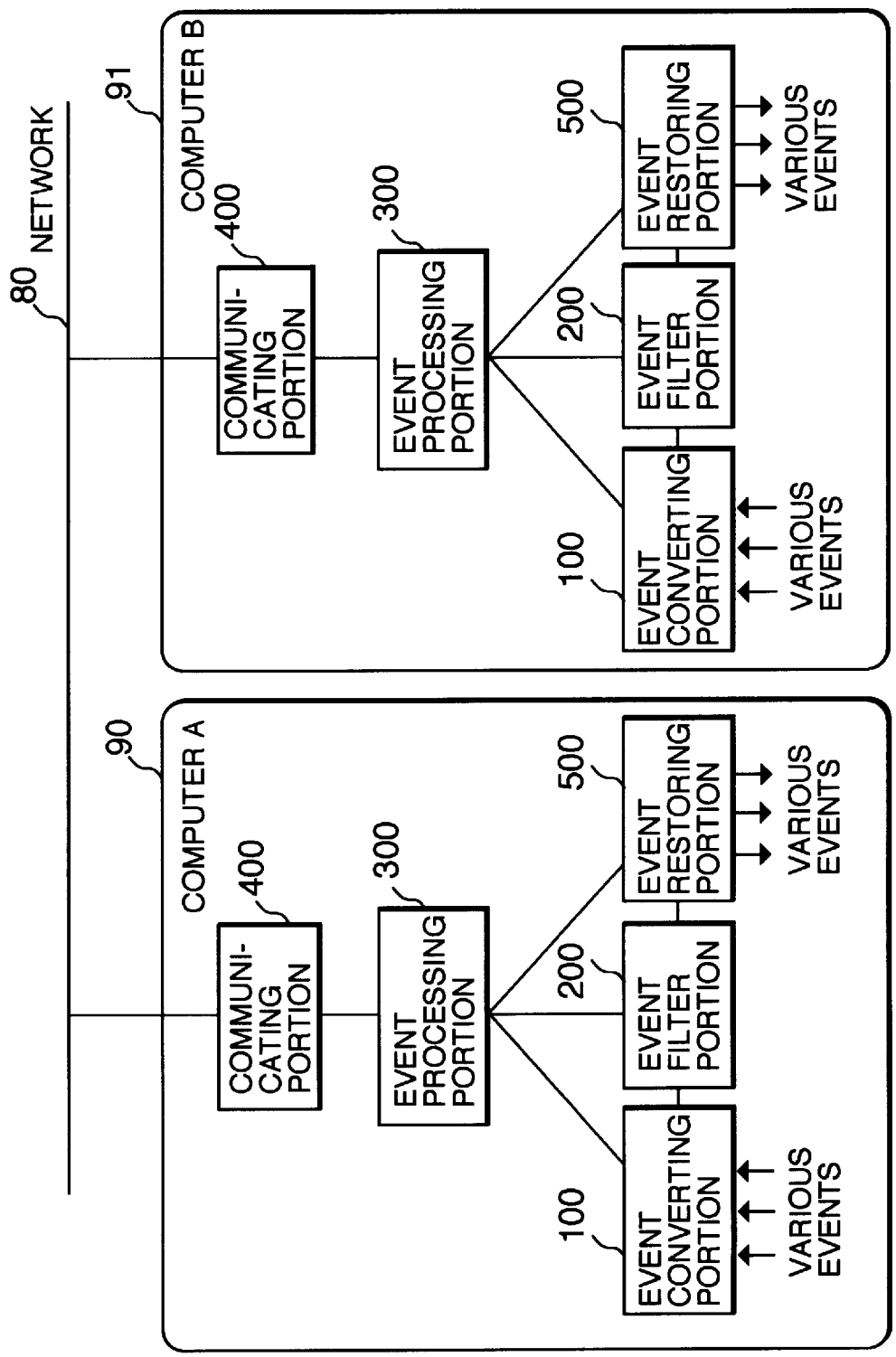
FIG. 8 is a block diagram showing an example of the overall structure of a distributed processing system to which the event controlling system according to a second embodiment of the present invention is applied.

FIG. 8 is a block diagram showing an example of the overall structure of an event driven system according to the second embodiment of the present invention in the case that the event driven system is disposed in a computer.

As shown in FIG. 8, with a plurality of (for example, two) computers A (90) and B (91) connected and communicated with each other through a network 80, a so-called distributed processing system is structured. An event controlling system disposed in each of the computers A (90) and B (91) connected through the network 80 comprises an event converting portion 100, an event filter portion 200, an event processing portion 300, a communicating portion 400, and an event restoring portion 500.

Figure 9:
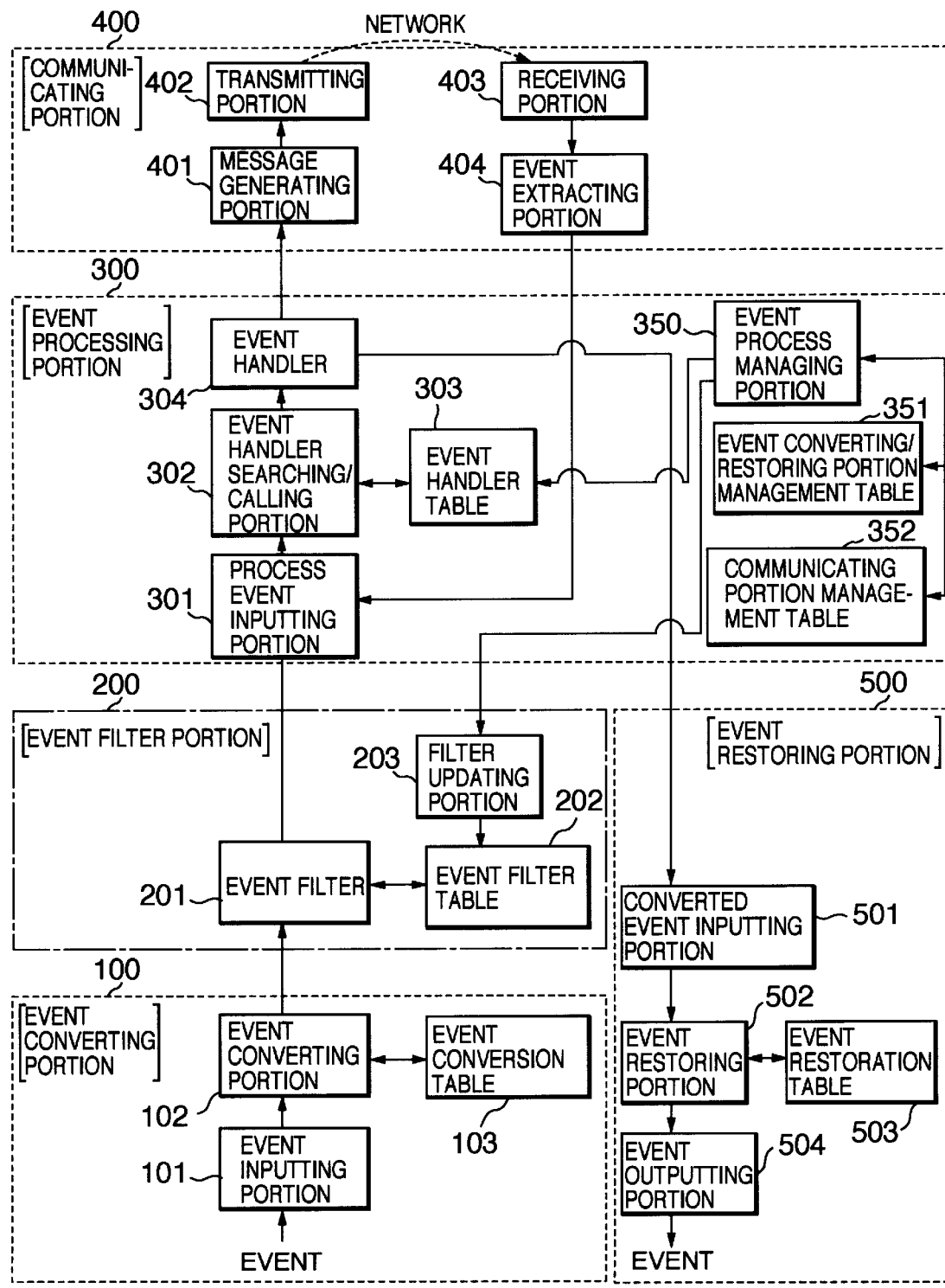
FIG. 9 is a block diagram showing the detailed overall structure of a distributed processing system to which the event controlling system according to the second embodiment of the present invention is applied.

FIG. 9 is a block diagram showing the detailed structures of the individual portions of the event controlling system shown in FIG. 8.

Referring to FIG. 9, the event converting portion 100 comprises an event inputting portion 101, an event converting portion 102, and an event conversion table 103. The event inputting portion 101 receives events that take place in the local computer and the other computer. The event converting portion 102 converts the format of a received event into a particular format. The event conversion table 103 is referenced by the event converting portion 102 in converting events.

In the event converting portion 100, the event inputting portion 101 receives events that take place in individual portions of the local computer. The event converting portion 102 references the event conversion table 103 stored in a particular storing unit of the local computer and converts the format of the events received by the event inputting portion into a particular format that can be handled by the event processing portion 300 (for example, a standardized format of the system). In this example, events can be thought of as input/output data of controlling units of the computers A and B or key input data that is input from a keyboard, and so on.

FIG. 10 shows an example of a converted event format (structure of a converted event). Referring to FIG. 10, the converted event has an event identifier and data with a variable length. A converted event is identified with only the event identifier rather than the difference in data. In other words, in FIG. 10, the structure of an event with an identifier "A" is defined as "DATA A" that is data with a variable length. An event with an identifier "B" does not have data with a variable length.

FIGS. 11 and 12 show examples of the structure of the event conversion table 103. FIG. 11 shows the case that a pre-converted event is identified with an event identifier as with a converted event. In other words, in FIG. 11, only identifiers of pre-converted events are correlated with converted events. Referring to FIG. 11, an event identifier "a" is converted into an event identifier "A". Likewise, an event identifier "b" is converted into an event identifier "B". FIG. 12 shows the case that a pre-converted event is identified with an input/output port of the computer. In this case, input/output port numbers are correlated with event identifiers. Referring to FIG. 12, an event identified with an input portion number "100" is converted into an event with an identifier "P". An event identified with an input port number "101" is converted into an event with an event identifier "Q".

The event filter portion 200 comprises an event filter 201, a event filter table 202, and a filter updating portion 203. The event filter 201 selects only an event to be sent to the event processing portion 300. The event filter table 202 is referenced by the event filter 201. The filter updating portion 203 properly updates the event filter table 202.

In the event filter portion 200, the event filter 201 that has received a converted event from the event converting portion 100 references the event filter table 202 stored in the particular storing unit of the computer, determines the processing necessity of the received event, and sends the event that needs to be processed to the event processing portion 300. FIG. 13 shows an example of the structure of the event filter table 202. In this example, event identifiers are correlated with the processing necessity of events. Referring to FIG. 13, an event identified with an event identifier "A" should be processed. An event identified with an event identifier "B" should not be processed. An event identified with an event identifier "C" should be processed.

The event processing portion 300 comprises a process event inputting portion 301, an event handler searching/calling portion 302, an event handler table 303, a group of event handlers 304, an event process managing portion 350, an event converting/restoring portion management table 351, and a communicating portion management table 352. The process event inputting portion 301 receives a converted event. The event handler searching/calling portion 302 searches an event handler corresponding to the received event. The event handler table 303 is referenced by the event handler searching/calling portion 302. The group of event handlers 304 define practical processes of events. The event process managing portion 350 manages the registration of an event. The event converting/restoring portion management table 351 and the communicating portion management table 352 are referenced by the event process managing portion 350.

In the event processing portion 300, the process event inputting portion 301 receives converted events from the event converting portion 100 and the communicating portion

400. The event handler searching/calling portion 302 references the event handler table 303 stored in the particular storing unit of the computer and searches at least one event handler 304 corresponding to the received event, and sends the received event to all of the searched event handlers 304. The event handlers 304 define event processing means such as "Send the event to the communicating portion 400", "Process the event inside the computer", "Send the event to the event restoring portion 500", and so forth for events. The event handlers 304 and events are correlated and registered on the event handler table 303.

FIG. 14 shows an example of the structure of the event handler table 303. In this example, event identifiers and event handlers 304 are correlated. Referring to FIG. 14, an event with an identifier "A" is given to event handlers "(EVENT) HANDLER A1", "(EVENT) HANDLER A2", and so forth. An event with an identifier "B" is given to an event handler "(EVENT) HANDLER B1".

The communicating portion 400 comprises a message generating portion 401, a transmitting portion 402, a receiving portion 403, and an event extracting portion 404. The message generating portion 401 generates a transmission message. The event extracting portion 404 extracts only event information from received data.

In the communicating portion 400, the message generating portion 401 adds necessary information such as address information of an event source and an event type information to an event received from the event processing portion 300 and sends the resultant information as a communication message to the transmitting portion 402. The transmitting portion 402 transmits the communication message to another computer through the network. The communication message transmitted from the transmitting portion 402 is received by the receiving portion 403 of another computer through the network. The event extracting portion 404 extracts an event from the transmission message. The extracted event is sent to the event processing portion 300.

When the communicating portion 400 transmits a communication message to a plurality of computers connected through the network, a particular protocol such as broadcast communication protocol or multi-cast communication protocol may be used. A plurality of communicating portions 400 that operate corresponding to different protocols and that have different destinations may be disposed in the same computer. In this case, an event is sent to a communicating portion 400 defined by an event handler 304.

The event restoring portion 500 comprises a converted event inputting portion 501, an event restoring portion 502, an event restoration table 503, and an event outputting portion 504. The converted event inputting portion 501 receives an event from the event processing portion 300. The event restoring portion 502 restores an event in a predetermined manner. The event restoring table 503 is referenced by the event restoring portion 502. The event outputting portion 504 outputs a restored event to a particular portion.

In the event restoring portion 500, the converted event inputting portion 501 receives an event from the event processing portion 300. The event restoring portion 502 references the event restoring table 503 stored in a particular storing unit of the computer and restores the particular format of the event (or converts the format of the received event into the particular format).

Figures 15, 16:
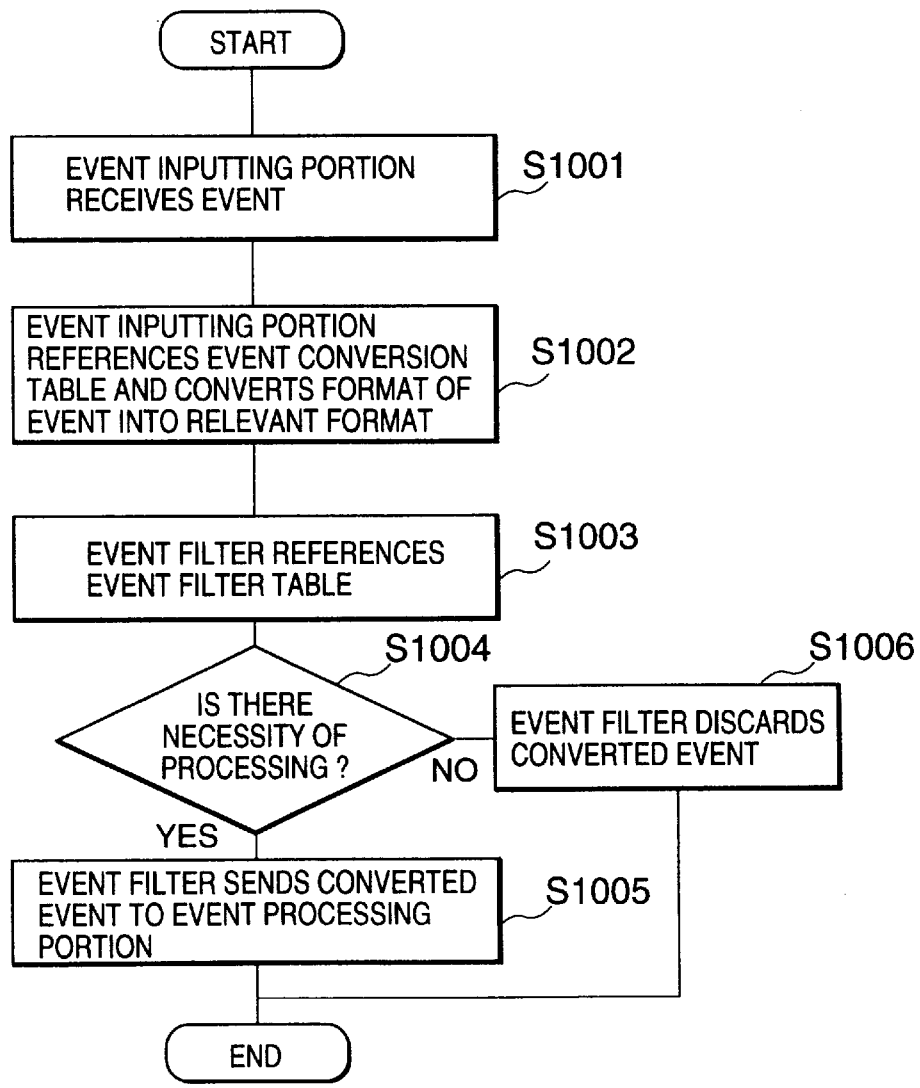
FIG. 15 shows an example of the structure of an event restoration table according to the second embodiment of the present invention.
FIG. 16 is a flow chart for explaining the operation of an event converting portion according to the second embodiment of the present invention.
Figure 17:
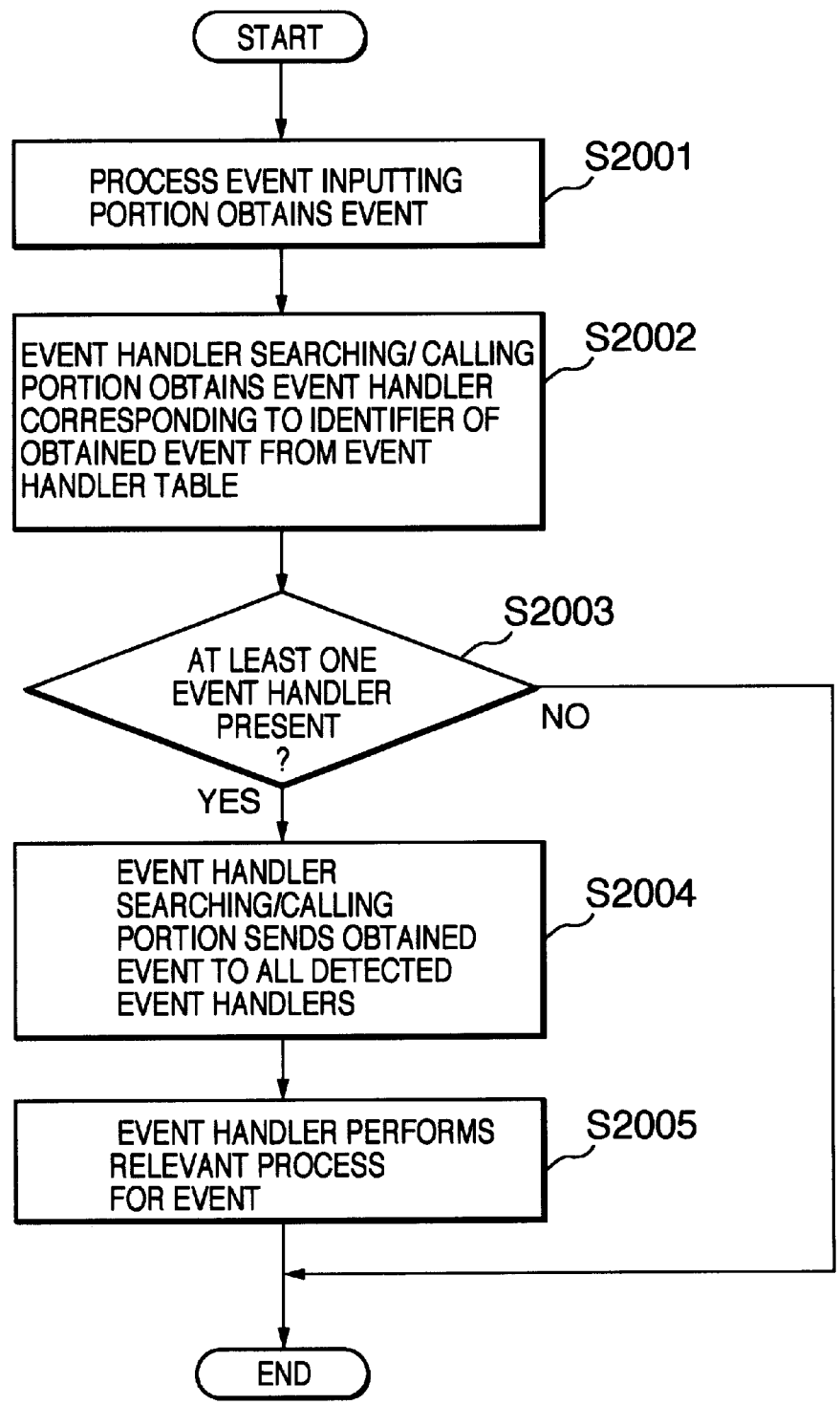
FIG. 17 is a flow chart for explaining the operation of an event processing portion according to the second embodiment of the present invention.
Figure 18:
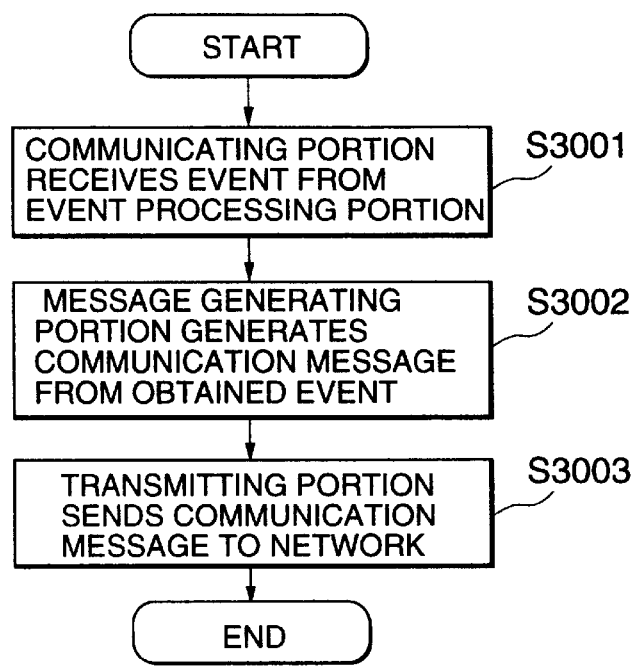
FIG. 18 is a flow chart for explaining the operation of a communicating portion according to the second embodiment of the present invention in the case that the communicating portion is in a transmitting mode.
Figure 19:
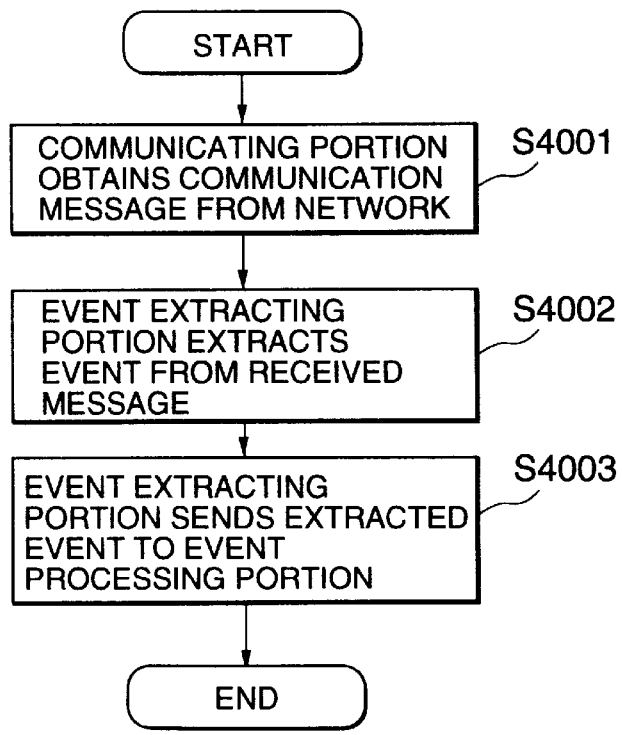
FIG. 19 is a flow chart for explaining the operation of the communicating portion according to the second embodiment of the present invention in the case that the communicating portion is in a receiving mode.
Figure 20:
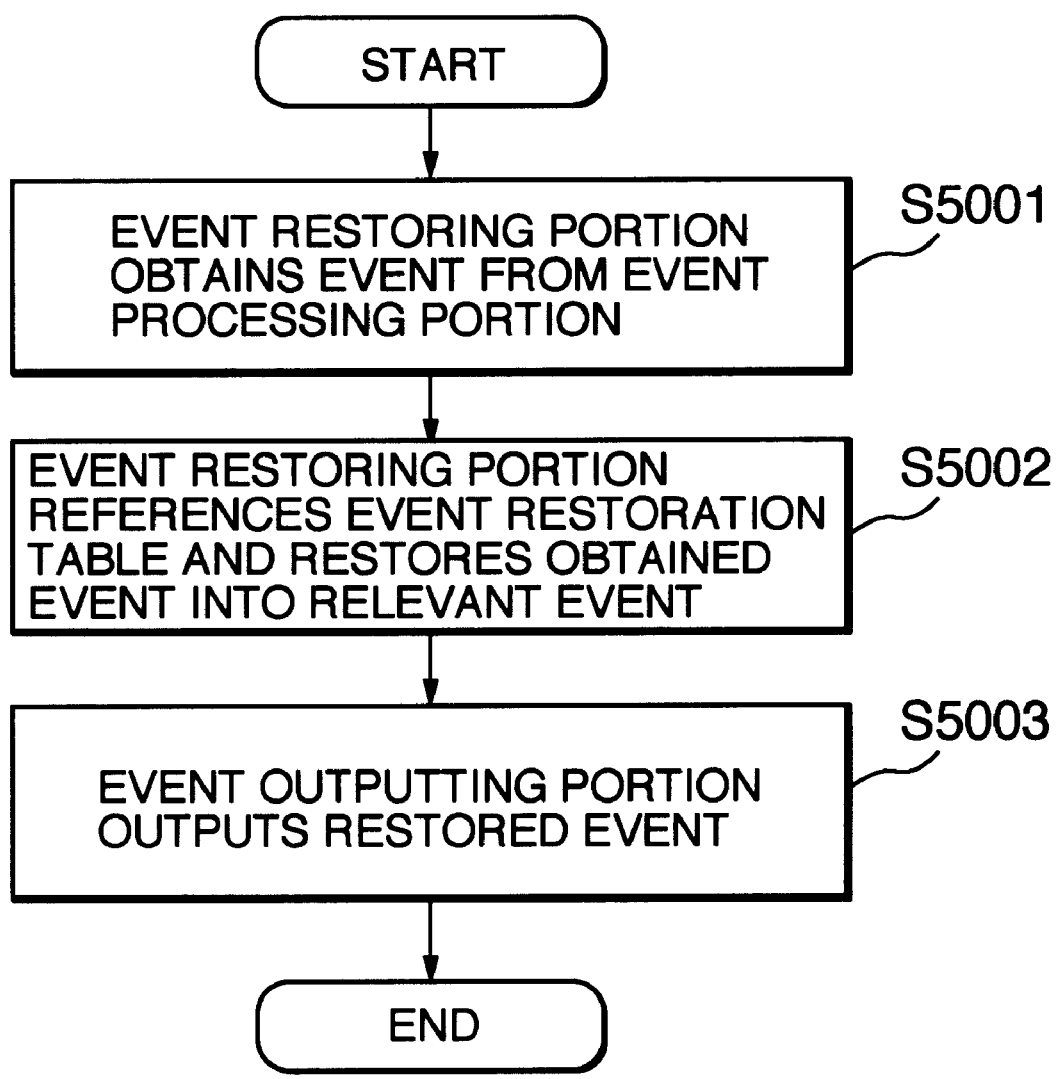
FIG. 20 is a flow chart for explaining the operation of an event restoring portion according to the second embodiment of the present invention.

FIG. 15 shows an example of the structure of the event restoration table 503. In this example, pre-restored event identifiers and restored event identifiers are correlated. Referring to FIG. 15, an event identifier "A" is converted into an event identifier "a". Likewise, an event identifier "B" is converted into an event identifier "b".

One event processing portion 300 corresponds to at least one event converting portion 100, at least one event restoring portion 500, and at least one communicating portion 400. The event processing portion 300 manages the event controlling portion 100, the event restoring portion 500, and the communicating portion 400. When the event converting portion 100, the event restoring portion 500, and the communicating portion 400 are used, respective registration requests are sent to the event processing portion 300. The event process managing portion 350 accepts the registration requests. The event converting portion 100 and the event restoring portion 500 are registered to the event converting/restoring portion management table 351 stored in a particular recording unit of the computer. The communicating portion 400 is registered to the communicating portion management table 352 stored in a particular storing unit of the computer. When the uses of the event converting portion 100, the event restoring portion 500, and the communicating portion 400 are stopped, respective deletion requests are sent to the event processing portion 300. As with the registration request, the event process managing portion 350 accepts the deletion requests and deletes the registrations of event converting portion 100, event restoring portion 500, and communicating portion 400 from the event converting/restoring portion management table 351 and the communicating portion management table 352.

In addition, before an event handler 304 is used, a registration request is sent to the event processing portion 300. When the event process managing portion 350 accepts the registration request, it registers information that represents the relation between the event handler 304 and a relevant event to the event handler table 303. As described above, a particular event may correspond to a plurality of event handlers 304. When the registration request is for an event that does not correspond to any event handler 304, the event process managing portion 350 references the event converting/restoring portion management table 351 and sends a process start request for the new event to all event converting portions 100 that have been registered. In the event filter portion 200, the filter updating portion 203 receives the process start request and updates the event filter table 202 so that the new event is processed. When an event handler 304 is deleted, a deletion request is sent to the event processing portion 300. The event process managing portion 350 accepts the deletion request and deletes the registration of the relevant event handler 304 from the event handler table 303. When there is no event handler 304 that corresponds to a particular event, the event process managing portion 350 references the event converting/restoring portion management table 351 and sends a process stop request for an event not having the corresponding event handler to all registered event converting portions 100. In the event filter portion 200, the filter updating portion 303 accepts the process stop request and updates the event filter table 202 so that the event is not processed.

Next, with reference to FIGS. 8, 9, 16, 17, 18, 19, 20, and 21, a process performed in the case that an event takes place in each portion of the computer will be described. FIGS. 16 to 20 are flow charts for explaining the operation of the event controlling system shown in FIG. 2.

Now, assuming that an "event a" takes place in a particular functional portion of the computer A, the "event a" is received by the event inputting portion 101 (at step S1001 in FIG. 16). The event inputting portion 101 references the event conversion table 103 stored in the particular storing unit, converts the "event a" into an "EVENT A" (at step S1002), and sends the "EVENT A" to the event filter 201. The event filter 201 references the event filter table 202 stored in the particular storing unit (at step S1003).

The event filter table has the information on the relation between events and necessity of processing thereof. The event filter 201 determines whether or not the process of the "EVENT A" is necessary based on the information of the event filter table 202. When the event filter table 202 does not have information of the "EVENT A", the event filter 201 determines that the process of the "EVENT A" is not necessary (at step S1004). When the determined result at step S1004 is "Processing necessary", the event filter 201 sends the "EVENT A" to the event processing portion 300 (at step S1005). When the determined result at step S1004 is "Processing not necessary", the event filter 201 discards the "EVENT A" and performs no further process (at step S1006).

In the event processing portion 300, the process event inputting portion 301 receives the "EVENT A" and sends the "EVENT A" to the event handler searching/calling portion 302 (at step S2001). The event handler searching/calling portion 302 references the event handler table 303 stored in the particular storing unit and searches at least one event handler 304 corresponding to the "EVENT A" (at step S2002). When the event handler searching/calling portion 320 has detected no event handler 304 that corresponds to the "EVENT A", it completes the process corresponding to the "EVENT A" (at step S2003). When the event handler searching/calling portion 320 has detected at least one event handler 304, it sends the "EVENT A" to all the obtained event handlers 304 (at step S2004).

When each event handler 304 receives the "EVENT A", it performs a predetermined process (at step S2005). If an event handler 304 has a function of transmitting a received event to the network, it sends the "EVENT A" to the communicating portion 400. If an event handler 304 has a function of restoring an event, it sends the "EVENT A" to the event restoring portion 500.

The communicating portion 400 receives the "EVENT A" from the event handler 304 (at step S3001). The message generating portion 401 adds source address information to the "EVENT A" as a communication message (at step S3002). The communicating portion 402 transmits the communication message through the network (at step S3003).

In the communicating portion 400 on the computer that receives a communication message, the receiving portion 403 receives a communication message through the network (at step S4001). The event extracting portion 404 deletes information added by the message generating portion 401 from the received communication message and obtains the "EVENT A" (at step S4002). The event extracting portion 404 sends the "EVENT A" to the event processing portion 300 (at step S4003).

In the event restoring portion 500, the converted event inputting portion 501 receives the "EVENT A" from the event handler 304 (at step S5001), references the event restoration table 503 stored in the particular storing unit, and restores the "event a" corresponding to the obtained "EVENT A" (at step S5002). The event outputting portion 504 outputs the restored "event a" to the computer B (at step S5003).

Next, with reference to FIGS. 9, 21, and 22, the dynamic control of the operation of the event filter portion 200 will be described. FIG. 22 is a flow chart for explaining the operation of the event controlling system shown in FIG. 9.

In the system shown in FIG. 9, one event processing portion 300 corresponds to a plurality of event converting portions 100, a plurality of communicating portions 400, and a plurality of event handlers 304. The event converting portions 100, the communicating portions 400, and the event handlers 304 are controlled by the event processing portion 300. In other words, when an event converting portion 100, a communicating portion 400, and an event handler 304 are used, they are registered to the event processing portion 300. When their uses are stopped, their registrations are deleted from the event processing portion 300.

Figure 21:
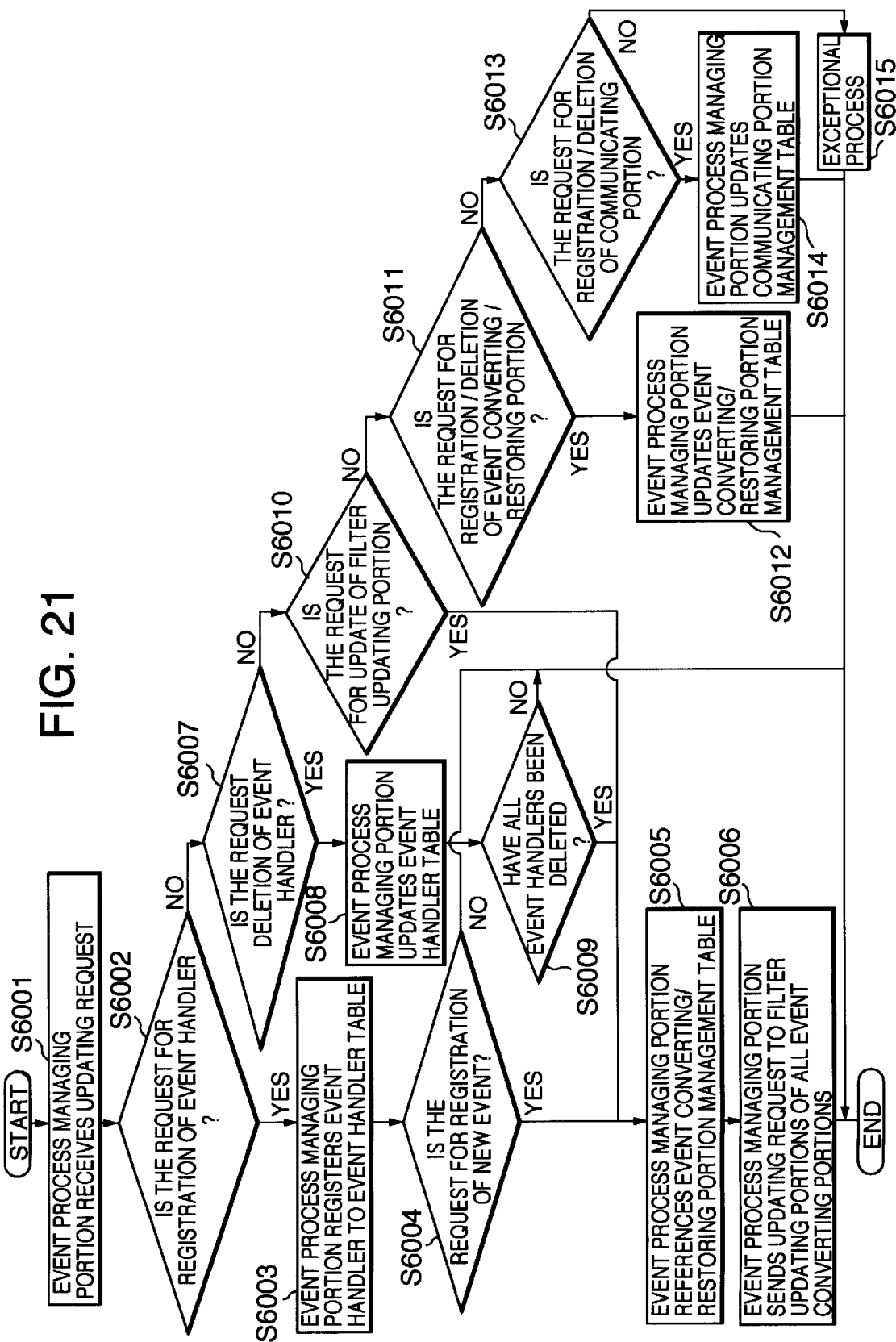
FIG. 21 is a flow chart for explaining the operation of an event process managing portion according to the second embodiment of the present invention.
Figure 22:
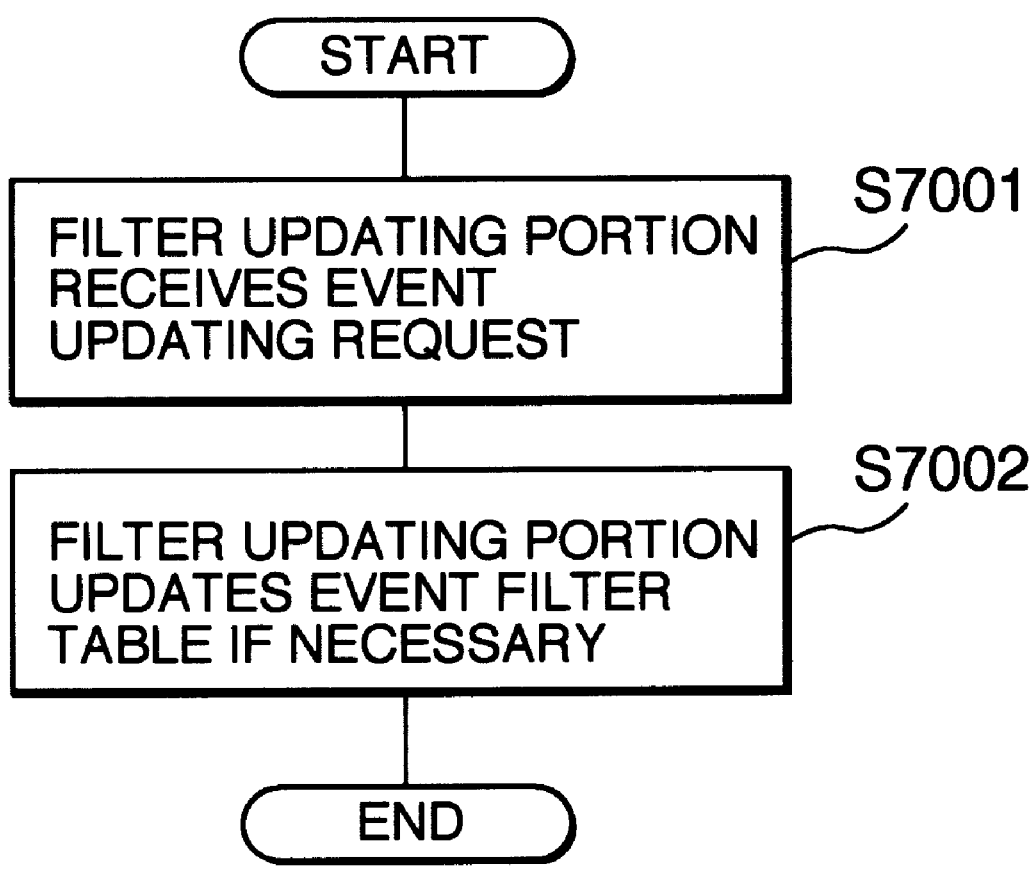
FIG. 22 is a flow chart for explaining the operation of a filter updating portion according to the second embodiment of the present invention.

The event process managing portion 350 accepts all management requests for the event processing portion 300 (at step S6001 in FIG. 21). When a management request represents the registration of an event handler corresponding to a particular event (at step S6002), the event process managing portion 350 registers the event handler 304 corresponding to the designated event to the event handler table 303 (at step S6003). When a management request represents the registration of an event that has been designated to another event handler 304 (namely, when the number of event handlers 304 corresponding to a designated event becomes two or more), event process managing portion 350 completes the process (at step S6004). Otherwise (namely, a management request represents the registration of a new event to an event handler 304), the event process managing portion 350 references the event converting/restoring portion management table 351 and obtains all event converting portions 100 that have been registered (at step S6005). Thereafter, the event processing managing portion 350 sends an event addition request to the filter updating portions 203 of all the obtained event converting portions 100 (at step S6006).

When a management request represents a deletion of an event handler 304 corresponding to a particular event (at step S6007), the event process managing portion 350 deletes the registration of the event handler 304 corresponding to the designated event from the event handler table 303 (at step S6008). At this point, if the number of event handlers 304 corresponding to the designated event is one or more, the event process managing portion 350 completes the process (at step S6009). Otherwise (namely, if there is no event handler 304 corresponding to the designated event), the event process managing portion 350 references the event converting/restoring portion management table 351, obtains all of the event converting portions 100 that have been registered (at step S6005), and sends an event deletion request to the filter updating portions 203 of all the obtained event converting portions 100 (at step S6006).

When the management request represents an update of the filter updating portion 203 (at step S6010), the event process managing portion 350 references the event converting/restoring portion management table 351, obtains all of the event converting portions 100 that have been registered (at step S6005), and sends a designated update request to the filter updating portions 203 of all the obtained event converting portions 100 (at step S6006).

When the management request represents registration/deletion of the event converting portion 100 and the event restoring portion 500 (at step S6011), the event process managing portion 350 updates the event converting/restoring portion management table 351 according to the request (at step S6012).

When the management request represents registration/deletion of the communicating portion 400 (at step S6013), the event process managing portion 350 updates the event converting/restoring portion management table 351 according to the request (at step S6014).

When the management request does not represent the above-described operations, the event process managing portion 350 performs a predetermined exceptional process (at step S6015).

In the event filter portion 200, the filter updating portion 203 receives an updating request from the event process managing portion 350 (at step S7001 in FIG. 22) and updates the event filter table 202 corresponding to the content of the update request (at step S7002). In other words, when the update request represents an event addition request, the filter updating portion 203 changes the information of the designated event to "processing necessary" on the event filter table 202. When the update request represents an event deletion request, the filter updating portion 203 changes the information of the designated event to "processing not necessary" on the event filter table 202.

As described above, corresponding to registration/deletion of an event handler 304 to/from an event processing portion 300, the event filer table 202 of the event filter portion 200 is updated. Only an event that has been converted by the event converting portion 100 and that can be processed at the time is sent to the event processing portion 300. Thus, the load of the event processing portion 300 can be decreased.

Figure 23:
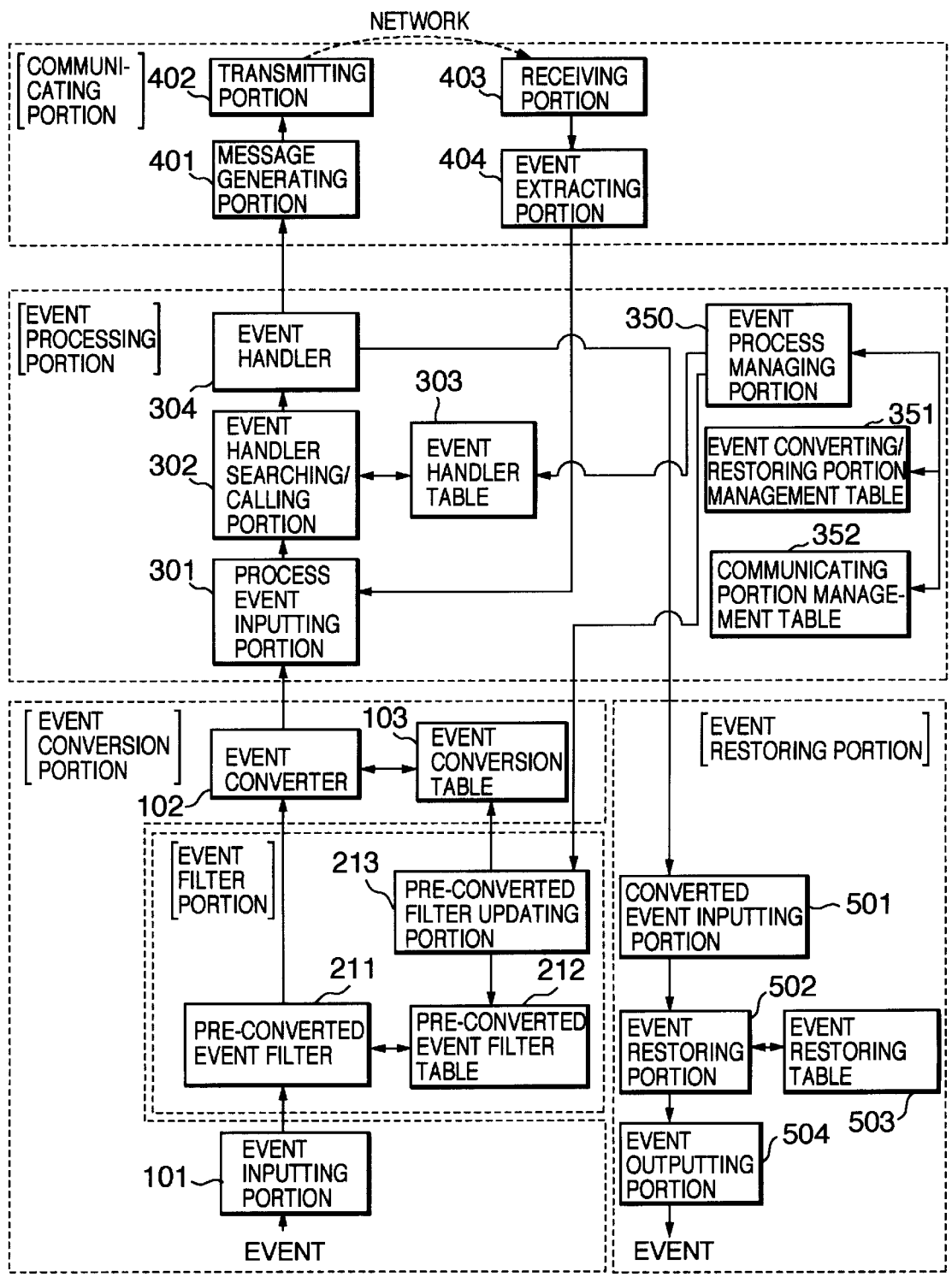
FIG. 23 is a block diagram showing an example of the structure of an event controlling system according to a third embodiment of the present invention.

Next, with reference to FIG. 23, a third embodiment of the present invention will be described. FIG. 23 is a block diagram showing the structure of an event controlling system according to the present invention. In FIG. 23, the event filter portion 200 shown in FIG. 9 is disposed in the event converting portion 100. Thus, for simplicity, in FIG. 23, similar portions to those in FIG. 9 are denoted by similar reference numerals and their description is omitted.

Various events are sent to an event filter portion 200. The event filter portion 200 converts the format of only events that can be processed into a particular format and sends the resultant events to an event processing portion 300. A pre-converted filter updating portion 213 in the event filter portion 200 receives an update request from an event process managing portion 350, references an event conversion table 103, reversely converts the format of a designated event to the pre-converted format, and updates information of the event on a pre-converted event filter table 212.

Thus, in this embodiment, since the event filter portion 200 sends only events that can be processed at the time to the event processing portion 300, the load of the event processing portion 300 can be decreased.

Figure 24:
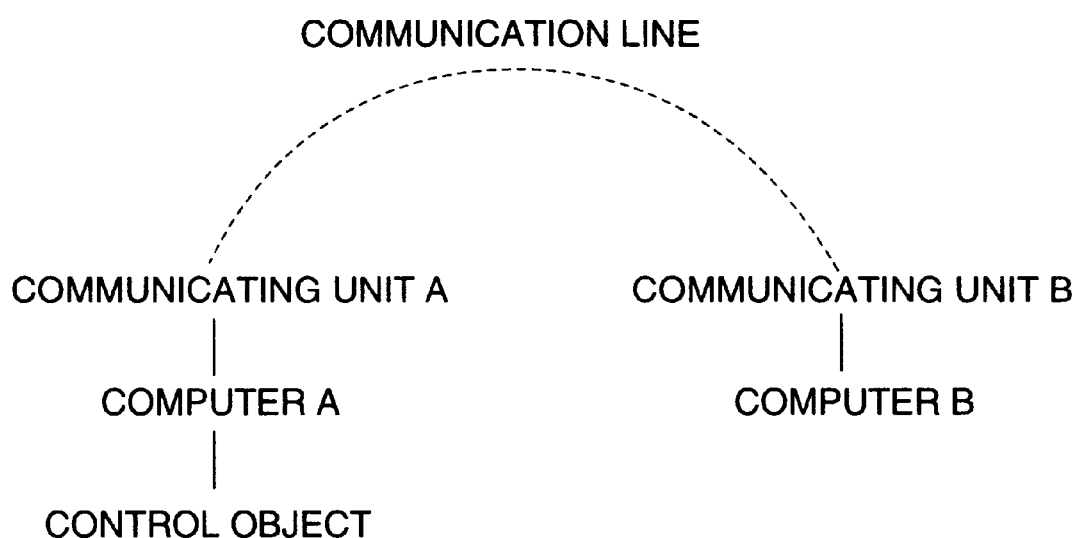
FIG. 24 is a schematic diagram showing a real example of a network according to a second or third embodiment of the present invention.
Figure 25:
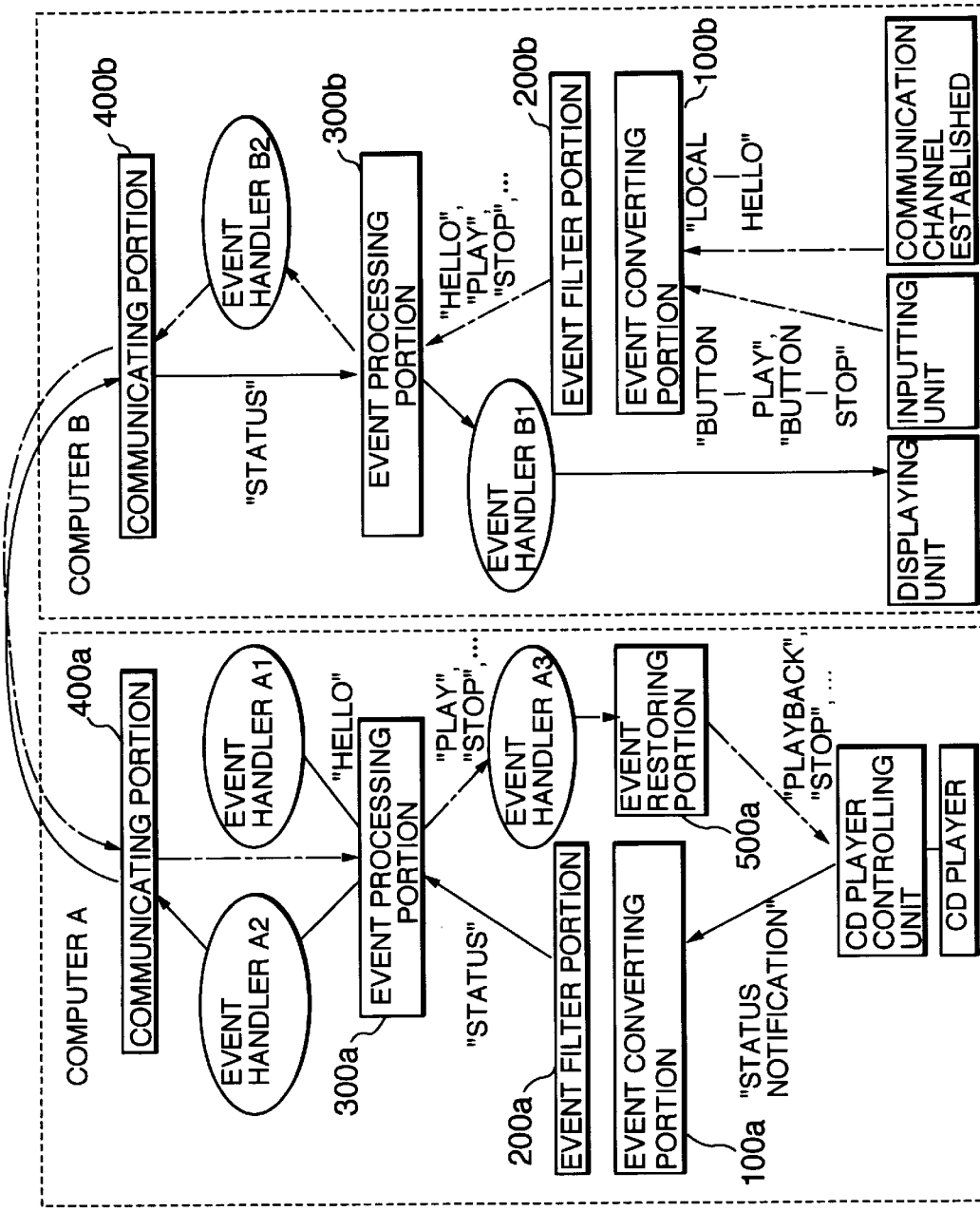
FIG. 25 is a state transition diagram for explaining the operation of the event controlling system of the network in FIG. 24 according to the second or third embodiment of the present invention.

Next, with reference to FIGS. 24 and 25, a remote monitoring/controlling system which is an actual example to apply the embodiment of the present invention will be described. In the remote monitoring/controlling system, a home appliance can be remotely monitored and controlled outside the home. FIG. 24 is a block diagram showing the structure of units of the system according to the embodiment. FIG. 25 is a state transition diagram conceptually showing the operations of the system. In FIG. 25, the function of the computer is shown in a rectangle, the event handler to be registered/deleted in order to perform event processing is shown in an ellipse, and the event name displaying the event transmitted between the function and the event handler is shown with double quotation marks.

Referring to FIG. 24, a control object (an appliance to be controlled), a computer A, and a communicating unit A are disposed in a home. The computer A controls the control object. The communicating unit A communicates with an external unit. The communicating unit A is for example a modem in the case of a public telephone line. On the other hand, a computer B and a communicating unit B are externally disposed. The computer B remotely controls the control object. The communicating unit B is connected to the computer B. The communicating unit B communicates with the communicating unit A. In this case, the computers A and B install the event controlling system according to the present invention.

In this example, it is assumed that the control object is a music CD player that is connected to the computer A and that can be monitored and controlled by the computer A. The operating system (basic software) of the computer A sends commands to the control object so as to monitor the CD player (namely, read the status of the CD player) and control the CD player (namely, perform for example playback operation, stop operation, and eject operation).

The computer A handles various events including monitor events and control events. An example of the monitor events is an event "status notification". The event "status notification to notify the present situation" takes place whenever the status changes (for example, the status "stop" changes to the status "playback"). In addition, while the CD player is in the status "playback", the event "status notification" periodically takes place. Examples of control events are "playback", "stop", "pause", and "eject". When the CD player receives such an event, it enters the relevant mode.

The computer B has a displaying unit (not shown in the figure) and an inputting unit. The displaying unit displays the status. The inputting unit inputs control commands. The displaying unit displays the statuses for example "playback", "stop", "pause", "eject", the total program number, playback program sequence, and elapsed time. The inputting unit has buttons corresponding to "playback", "stop", "pause", and "eject". When these buttons are pressed, events "BUTTON-PLAY", "BUTTON-STOP", "BUTTON-PAUSE", and "BUTTON-EJECT" take place. When the communicating unit B establishes a communication with an external unit, an event "LOCAL-HELLO" takes place which is for informing the external unit of the presence of the local unit and for acknowledging the external unit.

With reference to FIG. 25, the event controlling system in the computer B will be described. An event converting portion 100b converts an event "LOCAL-HELLO" of a local format into an event "HELLO" of a standardized format. Likewise, the event converting portion converts events "BUTTON-PLAY", "BUTTON-STOP", "BUTTON-PAUSE", "BUTTON-EJECT", which are produced by pressing the buttons, into events "PLAY", "STOP", "PAUSE", and "EJECT" of a standard format, respectively. The event converting portion 100b has an event filter portion 200b.

When the computer B is initialized, an event handler that sends a received event to a communicating portion 400b is registered as the event handler corresponding to the event "HELLO" in an event processing portion 300b. In addition, an event handler that reads information from the event "STATUS", controls the displaying unit (not shown in the figure), and registers an event handler to transmit the received event to a communicating portion 400a if event handlers corresponding to "PLAY", "STOP", "PAUSE", or "EJECT" have not been registered, is registered as an event handler corresponding to an event "STATUS" received from the computer A disposed in the home.

In this case, an event restoring portion is not disposed.

Next, the event controlling system in the computer A disposed in the home will be described.

An event converting portion 100a receives an event "STATUS NOTIFICATION", converts this event of a local format into an event "STATUS" of a standardized format, and sends the event "STATUS" to an event processing portion 300a. The event converting portion 100a has an event filter portion 200a.

When the computer A is initialized, an event handler A1 that refers to the event handler table 303a and that registers an event handler as corresponding to the event "STATUS" if the event handler A2 to transmit event "STATUS" to the communicating portion 400a is not yet registered on the event handler table 303a, is registered as an event handler corresponding to the event "HELLO". In addition, the event processing portion 300a registers an event handler A3 that sends a received event to an event restoring portion 500a as an event handler corresponding to event "PLAY", "STOP", "PAUSE", or "EJECT".

The event restoring portion 500a restores the events "PLAY", "STOP", "PAUSE", and "EJECT" to control events "PLAY", "STOP", "PAUSE", and "EJECT".

In the embodiment, the process is performed as follow.

When the computer A in the home is initialized, the CD player controlling unit periodically generates an event "status notification". However, at this point, since the event processing portion 300a has not registered an event handler corresponding to a converted event "STATUS", the event processing portion 300a discards the event "status notification".

When the external computer B is initialized and connected to the communication line, the computer B transmits an event "HELLO" to the computer A.

The computer A receives the event "HELLO". The event processing portion 300a of the computer A sends the event "HELLO" to the event handler A1. At this point, the event handler A1 registers the event handler A2. Since the event handler A2 is the first event handler corresponding to the event "STATUS", the event filter 201a (not shown in the figure) is updated. The event "STATUS NOTIFICATION" is changed to the event "STATUS". The event "STATUS" is sent to the event processing portion 300a.

The event handler A2 transmits the event "STATUS" to the communication line through the communicating portion 400a.

The transmitted event "STATUS" is received by the communicating portion 400b of the computer B. The received event "STATUS" is sent to the event processing portion 300b. The event processing portion passes the event "STATUS" to the event handler B1. Since the event handler B1 handles the event "STATUS" at first, the event handler B1 displays the event "STATUS" on the displaying unit and registers the event handler B2 to the event processing portion 300b. Since the event handler B2 is a first event handler corresponding to the event "PLAY", "STOP", "PAUSE", or "EJECT", the event filter 201b (not shown in the figure) is updated. The event "BUTTON-PLAY", "BUTTON-STOP", "BUTTON-PAUSE", or "BUTTON-EJECT" that is input from the inputting unit is converted into the event "PLAY", "STOP", "PAUSE", or "EJECT", respectively. The converted event is sent to the event processing portion 300b.

In this state, when the inputting unit of the computer B is operated, a relevant event of a local format is converted into an event of a standardized format. The converted event is transmitted to the computer A. Thus the CD player managed by the computer A is controlled. In addition, the status of the CD player of the computer A is transmitted to the computer B. Thus, the displaying unit of the computer B displays the status of the CD player.

Thus, without the computer B, events to be not processed are never transmitted from the computer A to the event processing portion 300a, the communicating portion 400a, and the network. Only when the computer B is connected, necessary events are transmitted to the computer B. Unless the computer B is connected to the computer A, even if the inputting unit of the computer B is operated, events are not transmitted to the computer B. Since the filter (event filter 201) is controlled depending on whether or not a handler (event handler 304) corresponding to an event is present, in the state that the computers A and B are present, even if a computer B2 that has the same function as the computer B is added to the communication line, the computers consistently operate.

As described above, according to the present invention, the events to be handled by various event driven systems can be uniformly handled. In addition, an event delivering system operating through a network can be easily structured. At the same time, such a function can be accomplished with a decrease of the load of the event processing unit.

In addition, according to the present invention, accompanying the decrease of the load of the event processing unit, the loads of the peripheral portions of the event processing unit (such as devices, network, and receiving side computer) can be decreased.

In addition, according to the present invention, a control object such as a home appliance can be adequately and smoothly controlled.

In addition, according to the present invention, in the case that a new apparatus to be controlled is added to the network in which another apparatus is in operation, the apparatuses and the event control system consistently operate.

The present invention is not limited to the above-descried embodiments. In other words, various modifications are available without departing from the spirit and scope of the present invention.

In the above-described embodiments, the event filter portion 200 is disposed as shown in FIGS. 9 and 23. However, the event filter portion 200 may be disposed at other positions.

For example, the event filter portion 200 may be disposed just upstream of the message generating portion 401. In this case, the event filter table 202 is updated in the same manner as the second embodiment.

Likewise, the event filter portion 200 may be disposed just downstream of the event extracting portion 404. In this case, the event filter table 202 is updated in the same manner as the second embodiment.

Likewise, the event filter portion 200 may be disposed just upstream of the event restoring portion 502. In this case, the event filter table 202 is updated in the same manner as the second embodiment.

Likewise, the event filter portion 200 may be disposed just downstream of the event restoring portion 502. In this case, the event filter table 202 is updated in the same manner as the third embodiment except that the event restoration table 503 is reversely referenced instead of the event conversion table 103.

As described above, according to the present invention, events to be handled by various event driven systems are uniformly handled. Different event driven systems are seamlessly integrated. In addition, an event delivering system operating through a network can be easily structured.

In addition, according to the present invention, since the event converting portion has an event filter that references an event processing necessity table stored in the storing unit and sends only events to that needs to be processed the event processing portion, events can be properly selected and discarded. Thus, the load of the event processing portion can be sufficiently decreased.

In addition, according to the present invention, the event converting portion has an event filter that references an event processing necessity table stored in the storing unit and sends only events that needs to be processed to the event processing portion. When the local controlling unit cannot execute an event, the unit can cause another controlling unit to execute the event through a communicating means. Thus, events can be properly selected and discarded. Consequently, the load of the event processing portion can be sufficiently decreased.

In addition, according to the present invention, since the event converting portion has an event filter that references an event processing table stored in the storing unit and sends only events that needs to be processed to the event processing portion, events can be properly selected and discarded. Thus, the load of the event processing portion (in particular, device) can be sufficiently decreased.

In addition, according to the present invention, since the event selecting/discarding criteria of the event filter are dynamically changed, the efficiency of the system is further improved.

In addition, according to the present invention, since events to be handled by various event driven systems can be handled uniformly, an event delivering system operating through a network can be easily structured. Moreover, such a function can be accomplished with a decrease of the load of the event processing unit.

In addition, according to the present invention, as the load of the event processing unit is decreased, the loads of the peripheral portions thereof (in particular, devices, network, and receiving computers) can be decreased.

In addition, according to the present invention, a control object such as a home appliance can be adequately and smoothly controlled.

In addition, according to the present invention, in the case that a new apparatus to be controlled is added to the network in which another apparatus is in operation, the apparatus and the event control system consistently operate.

Thus, according to the present invention, events can be adequately and smoothly controlled.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An event controlling system, comprising:

storing means for storing event format conversion rules;

first event converting means for converting the format of an event into a corresponding format by referring to the event format conversion rules when the event cannot be processed;

transmitting means for transmitting a communication message generated corresponding to the particular format converted by said first event converting means through a network;

receiving means for receiving the communication message through the network;

event restructuring means for restructuring an event whose format has been converted by said first event converting means from the communication message received by said receiving means; and second event converting means for converting the event restructured by said event restructuring means into an event of a format that can be executed by referring to the event format conversion rules.

2. The controlling system as set forth in claim 1, wherein the communication message is broadcast or multi-cast.

3. An event controlling system, comprising:

means for converting a first information that represents an event for controlling an object into a second information that has an executable format;

selecting means for selecting what needs to be processed out of the second information by referring to an event management area having processing necessity information for each event; and processing means for processing to drive an event corresponding to the second information selected by said selecting means.

4. The event controlling system as set forth in claim 3, wherein said processing means transmits the second information to a corresponding controlling system.

5. The event controlling system as set forth in claim 3, wherein said processing means comprises process method determining means for determining the way the second information is processed by referring to an area having information on how event should be processed.

6. The event controlling system as set forth in claim 3, wherein said processing means restores the event corresponding to the second information.

7. The event controlling system as set forth in claim 3, further comprising:

means for updating the area referred to by said selecting means if necessary.

8. The event controlling system as set forth in claim 3, further comprising:

means for adding a management information regarding the event to the event management area in the case that a new event takes place.

9. The event controlling system as set forth in claim 3, wherein the first information is inputted through the network.

10. The event controlling system as set forth in claim 3, further comprising:

process method determining means for determining the way the second information is processed by referring to an area having information on how each event should be processed;

wherein said selecting means is controlled in accordance with said process method determining means.

11. An event controlling system, comprising:

selecting means for selecting what needs to be processed out of a first information that represents an event for controlling an object by referring to an event management area having processing necessity information for each event;

means for converting the selected first information into a second information that has an executable format; and processing means for processing to drive an event corresponding to the second information.

12. The event controlling system as set forth in claim 11, wherein said processing means transmits the second information to a corresponding controlling system.

13. The event controlling system as set forth in claim 11, wherein said processing means comprises process method determining means for determining the way the second information is processed by referring to an area having information on how event should be processed.

14. The event controlling system as set forth in claim 11, wherein said processing means restores the event corresponding to the second information.

15. The event controlling system as set forth in claim 11, further comprising:

means for updating the area referred to by said selecting means if necessary.

16. An event controlling system, comprising:

means for receiving a first information that represents an event for controlling an object through a network;

selecting means for selecting what needs to be processed out of the received first information by referring to an event management area having processing necessity information for each event;

means for converting the first information selected by said selecting means into a second information that has an executable format; and processing means for processing to drive an event corresponding to the converted second information.

17. The event controlling system as set forth in claim 16, wherein said processing means comprises process method determining means for determining the way the second information is processed by referring to an area having information on how event should be processed.

18. The event controlling system as set forth in claim 16, wherein said processing means restores the event corresponding to the second information.

19. An event controlling system, comprising:

means for inputting a first information that represents an event for controlling an object;

means for converting the inputted first information into a second information that has an executable format;

process method determining means for determining the way the second information is processed by referring to an area having information on how each event should be processed; and means for selecting what needs to be processed out of the second information by referring to an event management area having processing necessity information for each event when the determined way of processing is to restore the event, and for restoring the selected second information.

20. An event controlling system, comprising:

means for converting a first information that represents an event for controlling an object into a second information that has an executable format;

process method determining means for determining the way the second information is processed by referring to an area having information on how each event should be processed; and means for restoring the second information when the determined way of processing is to restore the event, and for selecting what needs to be processed out of the restored second information by referring to an event management area having the processing necessity information for each event.

* * * * *